United States Patent Office 3,455,845
Patented July 15, 1969

3,455,845
METHOD FOR THE PRODUCTION OF FINELY-DIVIDED CATALYST COATINGS ON PORE-FREE SURFACES OF HYDROGEN-ABSORBING METALLIC SUBSTANCES, AND PRODUCT RESULTING THEREFROM
Ewald Wicke, Munster, Germany, and Albrecht Kuessner, Erlangen, Germany, assignors to Varta Aktiengesellschaft, Hagen in Westphalia, Germany, a corporation of Germany
No Drawing. Continuation-in-part of application Ser. No. 263,379, Mar. 4, 1963. This application Mar. 15, 1966, Ser. No. 534,400
Claims priority, application Germany, Mar. 16, 1965, V 28,066
Int. Cl. B01j 11/08
U.S. Cl. 252—474          13 Claims

ABSTRACT OF THE DISCLOSURE

A process for producing on a metallic body a microporous catalyst layer as a porous layer adhering on the surface of the metallic body which comprises charging the metallic body with hydrogen while the metallic body is in contact with an electrolyte solution containing at least one metal hydrogenation catalyst in ionic or complex ionic form, diffusing the hydrogen through the metallic body and concurrently therewith depositing the catalyst metal as a microporous layer on the metallic body. The metallic body is charged with hydrogen by contacting the body with an aqueous solution of an alkali metal boronate such as sodium or potassium boronate; or the body is charged by cathodic polarization while the catalyst is being deposited on the other side of the metallic body. The imperforate metallic body coated on its active sites with a porous, strongly adhering even coating having fissures of molecular dimension.

---

The invention relates to a method for the production of catalyst coatings on imperforate surfaces of hydrogen-sorbing metallic bodies, and to the coated bodies.

In U.S. Patent No. 2,773,561 to Hunter, nonporous metal foils are described, which consist of a palladium-silver alloy with a silver content of between 10% and 50% by weight which show an increased permeability for hydrogen as compared to foils of pure palladium.

In copending application Ser. No. 263,379, filed Mar. 4, 1963, of which this application is a continuation-in-part, there are described systems for the activation of hydrogen where the surface of a metallic body which is capable of sorbing and releasing hydrogen is provided with a catalyst coating for the purpose of accelerating the sorption and release of hydrogen. This can be performed by plating, sintering, evaporation, by vacuum or electrolytic deposition of suitable catalytic materials; particularly these procedures are applicable to those metals which have become known as hydrogenation catalysts.

All these known methods, however, are unsatisfactory in that they produce coatings of uneven thickness or do not have the desired fissures or crevices for transition between the surface of the catalyst layer and the compact metal, within an order of magnitude of about $5 \times 10^{-8}$ cm. width. Furthermore, there is often a deficiency in the required intimate contact between catalyst coating and metal surface, so that the transfer of sorbed hydrogen from the catalyst coating to the metallic body is impeded. The necessary fissures and good adhesion are requisite properties very difficult or as yet not achieved.

The invention provides a solution to the above-discussed difficulties and to the problem of developing a method for the production of a catalyst coating having the required fine fissures and crevices, of optimal thickness, and of sufficient adhesion to the surface of the metallic body to promote the sorption and diffusion of atomic hydrogen into the metal lattice, and vice versa.

The invention provides a process for applying a coating of a metal hydrogenation catalyst on the surface of a metallic body. The metal body which is essentially imperforate or nonporous, presents a typical metallic lattice through which atomic hydrogen can diffuse. The applied coating is a firmly adhering, very thin coating, e.g. in the range of 0.1 micron to 1 micron. The coating possesses a multitude of fine fissures or crevices of molecular dimensions. The invention also provides a method for charging the metallic body with hydrogen and exchanging it for the catalyst metal which is deposited on the surface of the metallic body. The invention further provides the coated metallic bodies obtained by the process which have a combination of desirable properties.

The invention provides a process for treating a metallic body which is loaded with hydrogen by contacting the surface of the body with an electrolyte solution which comprises in ionic form and/or in the form of complex ions at least one metal hydrogenation catalyst which is nobler than hydrogen. The hydrogen changes into ionic form thereby displacing the metal ions from the solution and depositing the catalyst metal on the surface of the metallic body. The metallic body may have been previously charged or loaded with hydrogen and/or this step may be carried out simultaneously with the treatment in the electrolyte solution.

The metallic body used in the invention comprises at least one metal: palladium and alloys of this metal with one or more metals such as silver, gold, platinum, rhodium, iridium, osmium, ruthenium, copper, tin, lead, and cadmium. In order to prevent corrosion of the metallic body in use the base metals tin, lead, and cadmium should be present in the alloys in an amount of no more than about 10%, by reference to the atomic composition.

The metallic hydrogenation catalyst used in the invention is a metal like palladium, platinum, ruthenium, rhodium, iridium, osmium, or a combination of these metals.

One embodiment of the invention comprises charging the metallic body with hydrogen, for instance, by cathodic polarization in an electrolyte suited for the generation of hydrogen, and subsequently immersing at least part of the surface of the hydrogen-charged body into an electrolyte solution containing the above-named hydrogenation metal catalyst in ionic or complex ionic form.

In another embodiment of the invention the metallic body in a suitable desired form or shape, for instance, as a small tube which is open or closed at one end, a sheet or a foil, a film, a membrane, or the like, is brought into contact on one side with the electrolyte suited for the generation of hydrogen while it is being cathodically polarized. Hydrogen ions are transferred to this side of the metallic body and enter into the metallic lattice. They diffuse through the lattice structure of the metallic body to its other side which is maintained in contact with a solution which comprises in ionic form or in the form of complex ions at least one catalyst metal of the above-described hydrogenation catalyst. On the side of the body which is maintained in contact with the solution, the hydrogen ions go into solution in the electrolyte, while electrons are transferred to the ions of the metal catalyst. The metal atoms formed in this manner are deposited on the metallic body, and accumulate to fine particles, building up a thin, firmly adhering coating interspersed with fissures and crevices of molecular dimensions, generally known as metal "black." During the deposition of the metal catalyst the cathodic polarization is maintained in order to provide a continuous and adequate supply of the requisite hydrogen for the deposition of the metal catalyst until the desired coating thickness is attained on the metallic body.

A preferred embodiment of practicing the method of the invention comprises providing with gaseous hydrogen, for instance, with the assistance of pressure, a first side of a metallic body which has been previously provided with a catalyst coating, contacting a second side of this body with a solution comprising the hydrogenation metal catalyst in ionic form, depositing on the second side, opposite the catalyst-treated first side, a coating of the hydrogenation catalyst resulting from the reducing effect of the hydrogen diffusing through the metallic lattice and forming hydrogen ions which displace the metal ions from the solution. Likewise, the process can be carried out without first coating one side with a catalyst, but by charging the body with hydrogen at elevated temperatures and hydrogen pressures, i.e. at conditions where the hydrogen diffuses into the lattice of the metallic body by pure thermal action without the presence of a catalyst. After cooling down to normal temperatures and pressure release the metallic body may be immersed with one side or totally in the electrolyte solution where the hydrogen reacts with the metal ions, thus causing deposition of the metal hydrogenation catalyst on the immersed surface of the body.

It is advantageous to prepare the surfaces of the metallic bodies by a mechanical and/or chemical pretreatment, such as with strong mineral acids. The deposition of the metal catalyst then takes place at a freshly cleaned surface of the metallic body. The improved contact of the coating with the metallic body which is obtained in this manner increases its adhesive strength and the catalytic effect with respect to activity and ageing.

As useful electrolyte for the electrochemical charging of the metallic body with hydrogen, there may be used any electrolyte which is inert to the material of the metallic body such as aqueous solutions of LiOH, NaOH, KOH, a carbonate solution of an alkali metal or a sulphate solution of an alkali or alkaline earth metal. Mixtures of soluble salts may also be used and a carbonate solution of an alkali metal or a sulphate solution of an alkali or alkaline earth metal. Useful electrolyes that can be employed include $Li_2SO_4$, $K_2CO_3$, $Na_2CO_3$, $MGSO_4$ and the like. One skilled in the art knows how to select the most suited electrolyte, for example, with a metallic body consisting of a palladium-silver alloy solutions containing a high concentration of nitric acid or of chloride ions are known not to be desirable. In another embodiment of the invention the metallic body is charged with hydrogen by contacting it with an aqueous solution of an alkali metal boronate. In the presence of the metals contained in the metallic body hydrogen is given off by the boronate and is sorbed by the metallic body. The solution is removed when enough hydrogen has been sorbed and the metallic body is then contacted with the electrolyte solution containing the catalyst metal an ionic form or in the form of complex ions, whereupon a coating is obtained as described before. Suitable alkali metal boronates for the above described process include sodium boronate, lithium boronate, and potassium boronate.

The cations or complex ions of the metal, or mixture of metals, chosen as transfer catalysts are employed preferably in a concentration of 0.1 mole per liter of electrolyte solution.

The length of treatment in the electrolyte solution depends predominantly on the thickness of the catalyst coating desired, the concentration of the ions in the solution, and the condition and extent of the hydrogen charge of the metallic body.

A catalyst coating containing an amount of catalyst in the range between 0.1 and 1.0 mg. per $cm.^2$ is preferred, this corresponding to a thickness of the coating between 0.1 and 1.0 micron. Greater thickness of the coating generally does not bring about further advantages. With a coating less thick, there is a risk that the surface of the metallic body may not be covered evenly.

The bodies of the invention may be used in a number of reactions and processes, for example: in the purification of gaseous hydrogen or its isotopes by removing therefrom gaseous impurities by means of the selective permeability of the bodies to hydrogen and/or its isotopes; in fuel cells, as imperforate hydrogen gas diffusion electrodes; in the production of pure hydrogen or hydrogen isotopes, preferably by electrolysis; for the separation of the isotopes of hydrogen by electrolysis and/or by means of difference in the rate of diffusion of isotopes of different mass in a continuous or in a batch process.

The following examples are illustrative of the invention and are not to be construed as a limitation thereto.

Example 1

The interior surface of a small palladium-silver tube intended for the production of hydrogen of highest purity (inside diameter 5 mm.; wall thickness 0.1 mm.); palladium-silver (Pd-Ag) in a ratio of 77:23; is covered with palladium black as transfer catalyst, as follows: The Pd-Ag tube, closed at one end, is cleaned with a silver-cleaning agent, inside and outside. The interior surface is then treated with medium fine emery paper and subsequently filled with concentrated nitric acid by means of a thin, long glass capillary. After a residence of about 20 to 30 seconds, the nitric acid is removed by suction by means of the capillary and the tube is rinsed several times with distilled water.

A glass tube, closed at one end, of about 2 cm. diameter, and having a side arm, is filled with potassium carbonate solution. The pre-treated small palladium-silver tube is immersed into this solution and is connected as a cathode. A thin platinum ribbon is used as an anode, for example, which is stretched along the inside wall of the glass tube, i.e., mounted at top and bottom, for instance, by fusing in place. With this arrangement, the small Pd-Ag tube is electrolytically charged with hydrogen for about ½ hour at a current density of about 100 ma./$cm.^2$.

Subsequently, the small Pd-Ag tube is filled with a palladium nitrate solution containing about 1 gram of palladium per 50 ml. of solution. Since the palladium-silver charged with atomic hydrogen represents an extremely strong reducing agent, within a short time (about 5 minutes) a coating of palladium black is deposited from the palladium nitrate solution onto the inside wall of the small tube.

A coating of platinum is obtained, when the above procedure is repeated replacing the palladium nitrate solution by a solution of chloroplatinic acid.

Example 2

Inside of a small palladium-gold tube otherwise the same as in the Example 1, which is closed at the bottom, is filled with an aqueous solution of 0.1 mole of chloroplatinic acid and $10^{-3}$ mole of lead acetate per liter. The metal alloy contains 72% palladium and 28% by weight of gold. This tube is connected to the negative pole of a source of current and is placed into an electrolyte bath, in which a cylindrical anode connected to the positive pole of the source of electrolytic current has been placed. A 2-normal aqueous solution of $Na_2CO_3$ is used as the electrolyte. Hydrogen ions are furnished by electrolytic action to the outer surface of the palladium-silver tube, and diffuse through the metal lattice of the wall of the tube to the inner surface, where the catalyst metal is deposited on the inner wall from the solution by the reducing action of the hydrogen. The catalyst coating is in the form of platinum black with a trace content of lead.

Example 3

An imperforate sheet of a palladium alloy of 5 $cm.^2$ containing 90% palladium, 1% iridium, and 9% copper by weight, with a thickness of 0.3 mm., is mounted in a plastic holder and placed in an electrolyte vessel, in such a position, that it separates two electrolyte spaces. The metallic body is also electrically connected with the negative pole of a current source, the positive pole of which is connected to a nickel counter electrode which serves as the anode of the electrolytic cell. The common electrolyte space of these two electrodes is filled with a 2-normal solution of potassium-carbonate; the second electrolyte space is filled with an aqueous solution containing 0.2 mole of palladium nitrate, and 0.05 mole of chloroplatinic acid per liter of solution. Hydrogen is generated at the surface of the palladium-alloy sheet which is immersed in the potassium carbonate solution by an electrolyte current of about 50 ma./cm.$^2$, while the catalyst metals are deposited on the opposite surface of the sheet by the reducing action of the hydrogen which has diffused through the sheet. A coating of palladium and platinum of about $1\mu$ thickness is deposited on the palladium-alloy sheet.

Example 4

An imperforate 10 cm.$^2$ sheet of a thickness of 0.08 mm. of an alloy of 77% by weight of palladium and 23% by weight of silver is first charged with hydrogen by subjecting it to a hydrogen atmosphere at a pressure of 100 kg./cm.$^2$ and a temperature of 200° C. for one hour. After cooling to room temperature, the sheet is immersed in an aqueous solution of 0.3 mole of palladium nitrate per liter. A catalyst coating of palladium black covering both sides of the sheet is obtained after about 10 minutes. The sheet is subsequently rinsed with distilled water and alcohol and is useful, for instance, for the separation of hydrogen from a gaseous mixture by selective diffusion.

Example 5

An imperforate sheet 10 cm.$^2$ of a thickness of 0.08 mm. of an alloy of 77% by weight of palladium and 23% by weight of silver is first charged with hydrogen by contacting it with an aqueous 10% sodium boronate solution. After about 15 minutes a sufficient amount of hydrogen has been sorbed by the sheet, the boronate solution is removed and the sheet is immersed in an aqueous solution of 0.3 mole palladium nitrate per liter. A catalyst coating of palladium black covering both sides of the sheet is obtained after about 10 minutes. The sheet is subsequently rinsed with distilled water and alcohol.

The continuing deposition of the palladium, or other hydrogenation catalysts from colored electrolyte solutions may be followed by means of the color change of the solution. The treatment is discontinued when the necessary amount of metal has been deposited, or when all of the metal in the solution is exhausted, this being determinable from a comparison of original concentration of salt solution used with that at any selected time during the process. The remaining palladium solution or other selected hydrogenation catalyst solutions are removed after the coating has been formed, and the metallic body is generally rinsed with distilled water and, subsequently, with methanol.

If it is intended to allow a catalyst-coated Pd-Ag surface to come into contact with air in dry condition, the hydrogen previously absorbed should be removed, for instance, by draining it off by vacuum. When evacuating with mercury pumps, it is advisable to carefully prevent the mercury vapor from poisoning the transfer catalyst by means of freezing or with a trap with gold foil.

We claim:

1. The process for producing a microporous catalyst layer on a non-porous metallic body which comprises charging the non-porous metallic body with hydrogen by contacting it with an aqueous solution of an alkali metal boronate, and then subsequently immersing the body in an electrolyte solution of a metal-containing hydrogenation catalyst in ionic form or complex ionic form, thereby exchanging the hydrogen sorbed for the metal catalyst and depositing the metal catalyst on the metallic body in finely divided form as a firmly adhering porous layer with crevices of molecular dimensions on the surface of the metallic body.

2. The process of claim 1 in which the alkali metal boronate is sodium boronate, potassium boronate, or lithium boronate.

3. The process for producing a microporous catalyst layer on a non-porous metallic body which comprises subjecting to cathodic polarization the metallic body to generate hydrogen, one side of which is in contact with an electrolyte in which a counter electrode is immersed and which is suited for hydrogen generation, while the other side of the metallic body is in contact with an electrolyte solution containing at least one metal-containing hydrogenation catalyst in ionic or complex ionic form, diffusing the generated hydrogen from one side of the metallic body to the other side thereof, exchanging the diffused hydrogen for said metal which deposits on the last-mentioned side as a microporous layer while maintaining the cathodic polarization and the supplying of hydrogen on said one side, until the desired layer thickness is attained on said other side of the metallic body.

4. The process of claim 3 in which the catalyst is deposited in finely-divided form as a firmly adhering porous layer permeated with crevices of molecular dimensions on the surface of the metallic body.

5. The process of claim 3 in which a first side of the metallic body has hydrogen sorbed thereon, a second side of the body being exposed to an electrolyte solution of a metal-containing hydrogenation catalyst, diffusing the hydrogen from the first to the second side of the metallic body, exchanging thereat the diffused hydrogen for the metal of the solution, and depositing said catalyst metal on the second side of the body as a firmly adhering microporous layer.

6. The process of claim 3 in which the coating is applied concurrently on both sides of the metallic body.

7. The process of claim 3 in which the coating is applied on one side of the metallic body.

8. The process of claim 3 in which the metallic body is of palladium or alloys of palladium with silver, gold, platinum, and rhodium.

9. The process of claim 3 in which there is deposited with the hydrogenation catalyst not more than about 10% based on atomic composition of copper, tin, lead, or cadmium.

10. A non-porous metallic body coated with a porous, strongly adhering even coating deposited on the active sites of the metallic body, said coating having fissures of molecular dimension, of a metal hydrogenation catalyst in an amount from about 0.1 to 1.0 mg. per square centimeter.

11. The body of claim 10 which is shaped as a tube or foil.

12. The body of claim 10 in which the coating has a substantially even thickness of between 0.1 to 1.0 micron.

13. The process for producing a microporous catalyst layer on a non-porous metallic body which comprises subjecting said metallic body to cathodic polarization to generate hydrogen, one side of said body being in contact with an electrolyte in which a counter electrode is immersed and which electrolyte is suited for hydrogen generation, while the other side of the metallic body is in contact with an electrolyte solution containing at least one metal containing hydrogenation catalyst in ionic or complex ionic form, diffusing the generated hydrogen from one side of the metallic body to the other side thereof, exchanging the diffused hydrogen for that metal which deposits on the last-mentioned side as a microporous layer while maintaining the cathodic polarization and the supplying of hydrogen on said one side, until the desired layer thickness is attained on said other side of the metallic body.

References Cited

UNITED STATES PATENTS

| | | | |
|---|---|---|---|
| 2,749,293 | 6/1956 | Wahlin | 204—240 |
| 3,086,881 | 4/1963 | Jenkin | 117—50 |
| 3,205,086 | 9/1965 | Brick et al. | 117—50 |
| 3,235,473 | 2/1966 | Le Duc | 204—30 |
| 3,291,643 | 12/1966 | Oswin et al. | 136—86 |

ALLEN B. CURTIS, Primary Examiner

H. FEELEY, Assistant Examiner

U.S. Cl. X.R.

117—50; 136—86, 120; 204—73, 290; 252—432, 472